United States Patent
Malik

(10) Patent No.: US 7,930,352 B2
(45) Date of Patent: *Apr. 19, 2011

(54) SYSTEM AND METHOD FOR SORTING ELECTRONIC COMMUNICATIONS

(75) Inventor: Dale W. Malik, Dunwoody, GA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 11/020,369

(22) Filed: Dec. 22, 2004

(65) Prior Publication Data

US 2005/0108346 A1    May 19, 2005

Related U.S. Application Data

(63) Continuation-in-part of application No. 09/888,718, filed on Jun. 25, 2001, now Pat. No. 7,133,898.

(51) Int. Cl.
G06F 15/16 (2006.01)
G06F 15/173 (2006.01)
G06F 17/30 (2006.01)

(52) U.S. Cl. ............... 709/206; 707/999.009; 707/10
(58) Field of Classification Search .............. 709/204, 709/206, 207; 707/10, 999.009
See application file for complete search history.

(56) References Cited

U.S. PATENT DOCUMENTS

| | | | |
|---|---|---|---|
| 5,621,729 A * | 4/1997 | Johnson et al. | 370/259 |
| 5,961,590 A | 10/1999 | Mendez | |
| 5,978,837 A * | 11/1999 | Foladare et al. | 709/207 |
| 5,999,932 A | 12/1999 | Paul | 707/10 |
| 6,003,070 A * | 12/1999 | Frantz | 709/206 |
| 6,023,700 A * | 2/2000 | Owens et al. | 1/1 |
| 6,023,723 A | 2/2000 | McCormick et al. | 709/206 |
| 6,047,310 A | 4/2000 | Kamakura et al. | 709/201 |
| 6,088,696 A | 7/2000 | Moon et al. | 707/10 |
| 6,199,099 B1 * | 3/2001 | Gershman et al. | 709/203 |
| 6,216,165 B1 | 4/2001 | Woltz | |
| 6,266,692 B1 * | 7/2001 | Greenstein | 709/206 |
| 6,321,267 B1 * | 11/2001 | Donaldson | 709/229 |
| 6,421,709 B1 | 7/2002 | McCormick | |
| 6,453,327 B1 | 9/2002 | Nielsen | |
| 6,460,036 B1 * | 10/2002 | Herz | 707/10 |
| 6,499,021 B1 * | 12/2002 | Abu-Hakima | 706/10 |
| 6,507,866 B1 | 1/2003 | Barchi | 709/207 |
| 6,574,658 B1 * | 6/2003 | Gabber et al. | 709/206 |
| 6,643,687 B1 | 11/2003 | Dickie et al. | 709/206 |
| 6,654,787 B1 | 11/2003 | Aronson et al. | 709/206 |
| 6,691,156 B1 * | 2/2004 | Drummond et al. | 709/206 |
| 6,697,462 B2 * | 2/2004 | Raymond | 379/93.02 |
| 6,708,205 B2 * | 3/2004 | Sheldon et al. | 709/206 |
| 6,772,196 B1 | 8/2004 | Kirsch et al. | 709/206 |

(Continued)

OTHER PUBLICATIONS

U.S. Appl. No. 09/888,718, filed Jun. 25, 2001, Dale W. Malik.

(Continued)

*Primary Examiner* — William C Vaughn, Jr.
*Assistant Examiner* — Muktesh G Gupta

(57) ABSTRACT

Systems and methods for intelligently sorting electronic communications, such as electronic advertisements, directed to a media device are disclosed. Prior to presenting the electronic advertisements to the user, the electronic advertisement is filtered into classifications based upon whether the electronic advertisement is from a commercial vendor from whom the user has indicated that he or she wishes to accept commercial electronic advertisements. The user is then presented at the media device with only the electronic advertisements that he or she had indicated were to be accepted.

21 Claims, 6 Drawing Sheets

U.S. PATENT DOCUMENTS

| | | | |
|---|---|---|---|
| 6,779,021 B1 | 8/2004 | Bates et al. | 709/206 |
| 6,934,684 B2* | 8/2005 | Alpdemir et al. | 704/265 |
| 6,938,021 B2* | 8/2005 | Shear et al. | 705/67 |
| 6,957,259 B1 | 10/2005 | Malik | |
| 7,013,290 B2* | 3/2006 | Ananian | 705/27 |
| 7,085,745 B2* | 8/2006 | Klug | 705/401 |
| 7,085,814 B1* | 8/2006 | Gandhi et al. | 709/208 |
| 7,133,898 B1 | 11/2006 | Malik | |
| 7,143,089 B2 | 11/2006 | Petras | |
| 7,177,909 B2* | 2/2007 | Stark et al. | 709/206 |
| 7,181,017 B1* | 2/2007 | Nagel et al. | 380/282 |
| 7,277,919 B1* | 10/2007 | Donoho et al. | 709/206 |
| 2001/0023432 A1 | 9/2001 | Council | |
| 2001/0027474 A1 | 10/2001 | Nachman et al. | 709/204 |
| 2001/0032232 A1* | 10/2001 | Zombek et al. | 709/201 |
| 2001/0039514 A1* | 11/2001 | Barenbaum et al. | 705/14 |
| 2001/0049745 A1 | 12/2001 | Schoeffler | |
| 2002/0013759 A1* | 1/2002 | Stewart et al. | 705/37 |
| 2002/0021675 A1 | 2/2002 | Feldmann | |
| 2002/0026484 A1 | 2/2002 | Smith | |
| 2002/0049806 A1 | 4/2002 | Gatz | |
| 2002/0052855 A1 | 5/2002 | Landesmann | |
| 2002/0052968 A1* | 5/2002 | Bonefas et al. | 709/231 |
| 2002/0091777 A1 | 7/2002 | Schwartz | |
| 2002/0092019 A1* | 7/2002 | Marcus | 725/37 |
| 2002/0107973 A1* | 8/2002 | Lennon et al. | 709/231 |
| 2002/0116641 A1 | 8/2002 | Mastrianni | 713/201 |
| 2002/0120600 A1* | 8/2002 | Schiavone et al. | 707/1 |
| 2002/0120627 A1* | 8/2002 | Mankoff | 707/10 |
| 2002/0120692 A1* | 8/2002 | Schiavone et al. | 709/206 |
| 2002/0120702 A1* | 8/2002 | Schiavone et al. | 709/207 |
| 2002/0178224 A1* | 11/2002 | Kasajima | 709/206 |
| 2002/0198950 A1* | 12/2002 | Leeds | 709/206 |
| 2003/0009526 A1 | 1/2003 | Bellegarda | |
| 2003/0233420 A1* | 12/2003 | Stark et al. | 709/206 |
| 2007/0233839 A1* | 10/2007 | Gaos | 709/223 |
| 2008/0120379 A1 | 5/2008 | Malik | |

OTHER PUBLICATIONS

U.S. Appl. No. 09/888,719, filed Jun. 25, 2001, Dale W. Malik.
U.S. Appl. No. 09/888,719, filed June 25, 2001.
U.S. Appl. No. 11/190,326, filed July 27, 2005.
U.S. Appl. No. 12/022,645, filed Jan. 30, 2008.
Office Action dated Jul. 11, 2008; U.S. Appl. No. 11/554,459, filed Oct. 30, 2006.
Office Action dated Nov. 25, 2008; U.S. Appl. No. 11/554,459, filed Oct. 30, 2006.

* cited by examiner

SYSTEM AND METHOD FOR SORTING ELECTRONIC COMMUNICATIONS

RELATED APPLICATIONS

The present application is a continuation-in-part of U.S. patent application Ser. No. 09/888,718 filed on Jun. 25, 2001 now U.S. Pat. No. 7,133,898, and entitled "System and Method For Sorting E-mail," the contents of which are hereby incorporated by reference in their entirety. The present application is related by subject matter to U.S. patent application Ser. No. 09/888,719 filed Jun. 25, 2001 and entitled "System and Method For Regulating Electronic Messages," the contents of which are hereby incorporated by reference in their entirety.

FIELD OF THE INVENTION

The disclosed systems and methods relate generally to electronic communications, and more particularly, to systems and methods for intelligently sorting electronic communications.

BACKGROUND

Electronic communication devices have become ubiquitous in modern society. Indeed, electronic communication devices such as, for example, phones, cell phones, personal digital assistants (PDAs), pagers, televisions, desktop computers, and laptop computers, are everywhere and have penetrated every aspect of modern life.

While these electronic communication devices have greatly enhanced communication, they also present a new set of associated problems. In particular, users of electronic communication devices have been burdened by an avalanche of electronic communications relating to commercial activities, which are referred to herein as electronic advertisements. Indeed, for users of electronic communication devices, electronic advertisements seem constantly to be arriving in the form of, for example, e-mail, banner advertisements, streaming video, instant messages, SMS messages, pages, etc. Indeed, the creation of SPAM e-mail has given rise to an entire new industry. Users spend inordinate amounts of time listening to and viewing advertisements that they simply would prefer not to have been bothered with. Furthermore, for some technologies such as e-mail and instant messages, users spend too much time reviewing, sorting, and replying to the numerous electronic communications that are received daily.

Applicant has recognized that there is a need in the art for systems and methods for automatically restricting electronic communications, such as electronic advertisements, sent to electronic media devices and allowing users to control the types of advertising that they receive. More particularly, Applicant has recognized a need in the art for systems and methods that automatically filter electronic communications directed to media devices according to whether the electronic communication is from a party from whom a user has indicated that he or she wishes to accept electronic communications, whether the electronic communication is of a particular type that the user desires to receive, and whether the electronic communication is directed to a media device on which the user wishes to receive electronic communications. Systems and methods with these characteristics would greatly enhance the user experience and empower users with control over the information that flows to them.

SUMMARY

Generally, systems and methods for intelligently filtering electronic communications, such as electronic advertisements, directed to electronic media devices are disclosed herein.

According to an illustrative embodiment of the disclosed systems and methods, prior to presenting the electronic communication to a user, the electronic communication is filtered according to whether the electronic communication is from a party that has registered to send electronic communications to the user, whether the electronic communication is of a type that the user desires to receive, and whether the electronic communication is directed to a media device at which the user desires to receive electronic communications. With electronic communications filtered and sorted in this manner, the user receives only those communications he/she wishes to review and further may review them in a fashion that it is much more manageable for the user.

According to an aspect of the disclosed systems and methods, providers of electronic communications may be registered to forward electronic communications to a user. The registration may be a generic automated process or an individualized process by which users specify the particulars of registration for each provider. For electronic communications that are e-mail advertisements, for example, e-mail received from registered sources is sorted and presented separately from commercial e-mail that is not registered. For example, the web site www.usair.com may become registered to send electronic advertisements to a user. During the registration process, the web site (e.g. www.usair.com) is assigned a party registration code. Accordingly, when an electronic communication such as an e-mail is forwarded from the site www.usair.com, it should include the party registration code. The e-mail client recognizes the code and presents the e-mail from www.usair.com so as to be distinguished from other commercial e-mail that does not contain a registration code or other commercial e-mail. Thus, the electronic advertisements that the user wishes to see are separated from the unregistered SPAM that typically may be forced upon the user.

According to a further aspect of the disclosed systems and methods, even for electronic communication sources that have been "registered" to send electronic communications to a user, only specific types of electronic communications may be authorized. For example, a user may authorize receiving special promotions or bills from a commercial site but may not want to receive general commercial electronic advertising. Perhaps, a user wishes only to receive electronic communications regarding certain products or types of products. In an embodiment of the disclosed systems and methods, specific categories of electronic communications have a party registration purpose code assigned thereto. When a user authorizes receiving a specific category or type of communication from a party, the party registration purpose code is stored for future reference and forwarded to the party for use in forwarding electronic communications.

According to a further aspect of the disclosed systems and methods, even for electronic communication sources that have been "registered" to send electronic communications to a user, the user may only specify to receive electronic communications at a particular device. For example, a user may authorize receiving streaming video electronic communications from a party on his/her television, while refusing e-mail electronic communication from the same party on a personal computer. When a user authorizes receiving electronic communication at a media device from a party, the types of media devices at which the user is willing to receive electronic communications are stored for use in the sorting process and are forwarded to the party for use when forwarding electronic communications.

A user may also specify what he/she wishes to be done with electronic communications that have not been authorized. For example, a user may specify that electronic communications that are not from a registered party are simply to be discarded. Alternatively, a user may specify that electronic communications that are not from a registered source, or of a registered category, should be grouped together depending on the type of electronic communication and the type of media device to which they are directed. For example, a streaming video advertisement directed to a television set from an electronic advertiser that is not registered may be discarded because the immediate nature of streaming video does not lend itself to storage for later viewing. However, a user may specify that e-mail electronic advertisements from an unregistered party be preserved for later reviewing as e-mail can be easily grouped in a separate directory or file.

A person using the filtering and sorting functionality of the disclosed systems and methods may determine that solely unwanted electronic communications are being received from a particular source. For example, it may become clear that only unwanted SPAM e-mail or text messages are being received from a particular source. Accordingly, in an embodiment of the disclosed systems and methods, a user may block electronic communications from the source. When an electronic communication is received from a source that has been blocked, a reply message, such as, for example, an e-mail is sent to the source along with an indication that electronic communications are no longer being accepted. The reply may also provide information on whom to contact in case there has been a mistake in the decision to block the electronic communications.

Additional aspects of the disclosed systems and methods are described in detail below.

BRIEF DESCRIPTION OF THE DRAWINGS

Other features of the disclosed systems and methods will be further apparent from the following detailed description of presently preferred exemplary embodiments taken in conjunction with the accompanying drawings, of which.

DETAILED DESCRIPTION OF ILLUSTRATIVE EMBODIMENTS

A system and method with the above-mentioned beneficial features in accordance with a presently preferred exemplary embodiment of the invention will be described below with reference to FIGS. 1-6. It will be appreciated by those of ordinary skill in the art that the description given herein with respect to those figures is for exemplary purposes only and is not intended in any way to limit the scope of the potential embodiments. Questions regarding the scope of the potential embodiments may be resolved by referring to the appended claims.

Generally, applicant discloses herein systems and methods for intelligently filtering and sorting electronic communications, such as electronic advertisements for example. Electronic communications are sorted into classifications based, e.g., upon whether the electronic communications are from a party or commercial vendor from which the user has indicated that he or she wishes to accept electronic communications, or whether the electronic communications are from an unknown source. Further sorting of electronic communications may be made depending upon whether the electronic communication is regarding an authorized category or type of commercial activity and/or whether it is directed to a particular activity.

Figure 1:
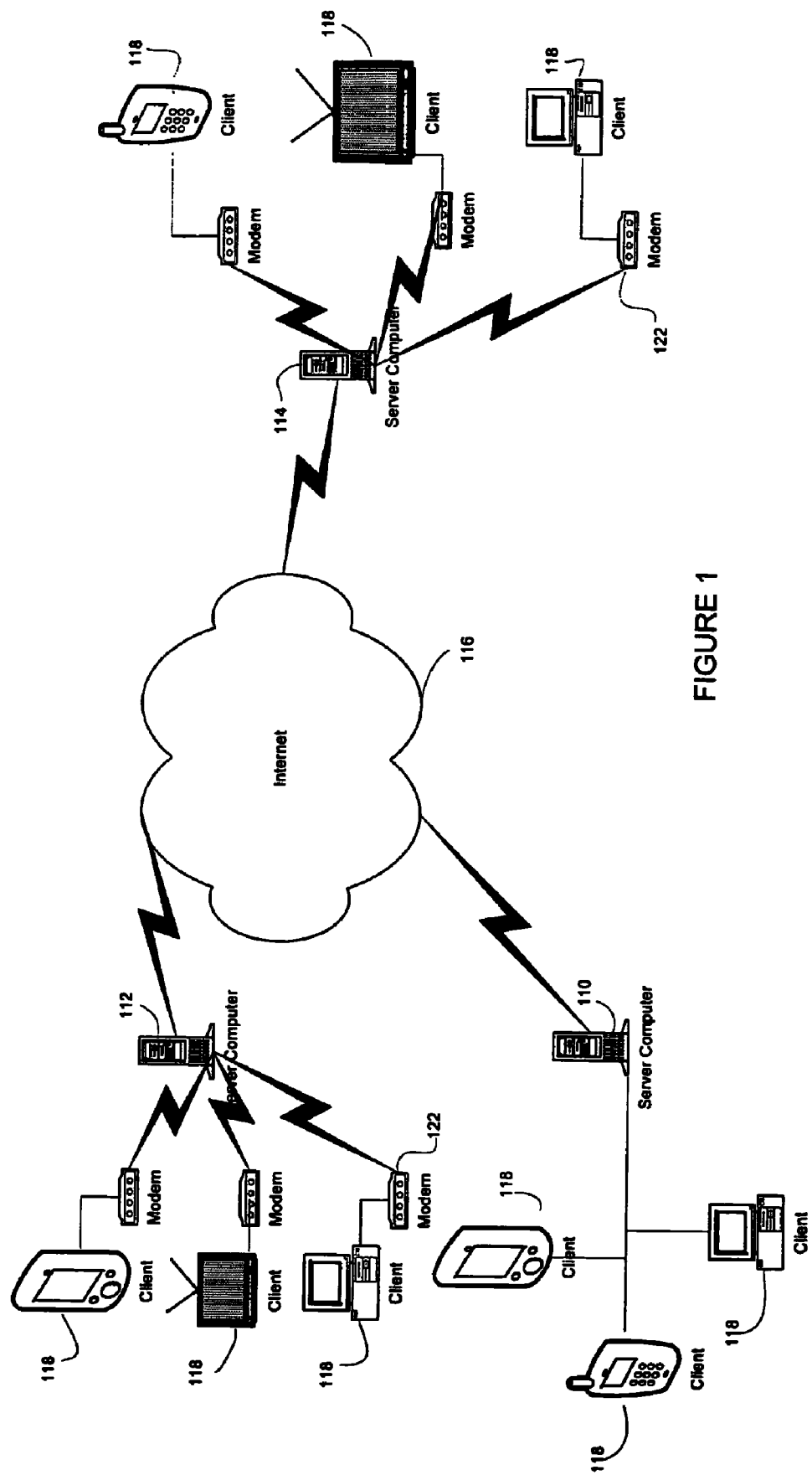
FIG. 1 is a high level diagram of a network for transmitting electronic communications.

FIG. 1 is a high level diagram of an exemplary computer network for communicating electronic communications. As shown, three electronic communication servers 110, 112, and 114 are operable to communicate with one another over network 116, which may be for example, the Internet. According to an illustrative embodiment, electronic communication servers 110, 112, and 114 may receive electronic communications from third parties and communicate electronic communications and information about said communications amongst themselves. Electronic communications servers 110, 112, and 114 operate as a gateway for electronic communications directed toward media devices 118.

While FIG. 1 shows communication severs 110, 112, and 114 as distinct and separate from media device 118, it is for illustrative purposes and not meant to limit the invention to distinct servers and media devices. Media devices 118 are desirably capable of operating as communication servers.

Media devices 118 may be any electronic device at which communications, such as electronic advertisements, may be electronically received and may include, for example, personal digital assistants, cellular phones, personal computers, televisions. Media devices 118 may connect to electronic communication servers 110, 112, 114 via a local area network (LAN) 120, as shown in relation to electronic communication server 110, or using a remote connection device 122 such as, for example, a modem, as is shown in connection with electronic communication servers 112 and 114. Media devices 118 may connect with electronic communication servers over a wireless internet connection, or through a wireless mobile telecommunications network. In addition, Media devices 118 may connect to other Media Devices 118 directly, or through a distributed peer to peer type network, for example.

Figure 2:
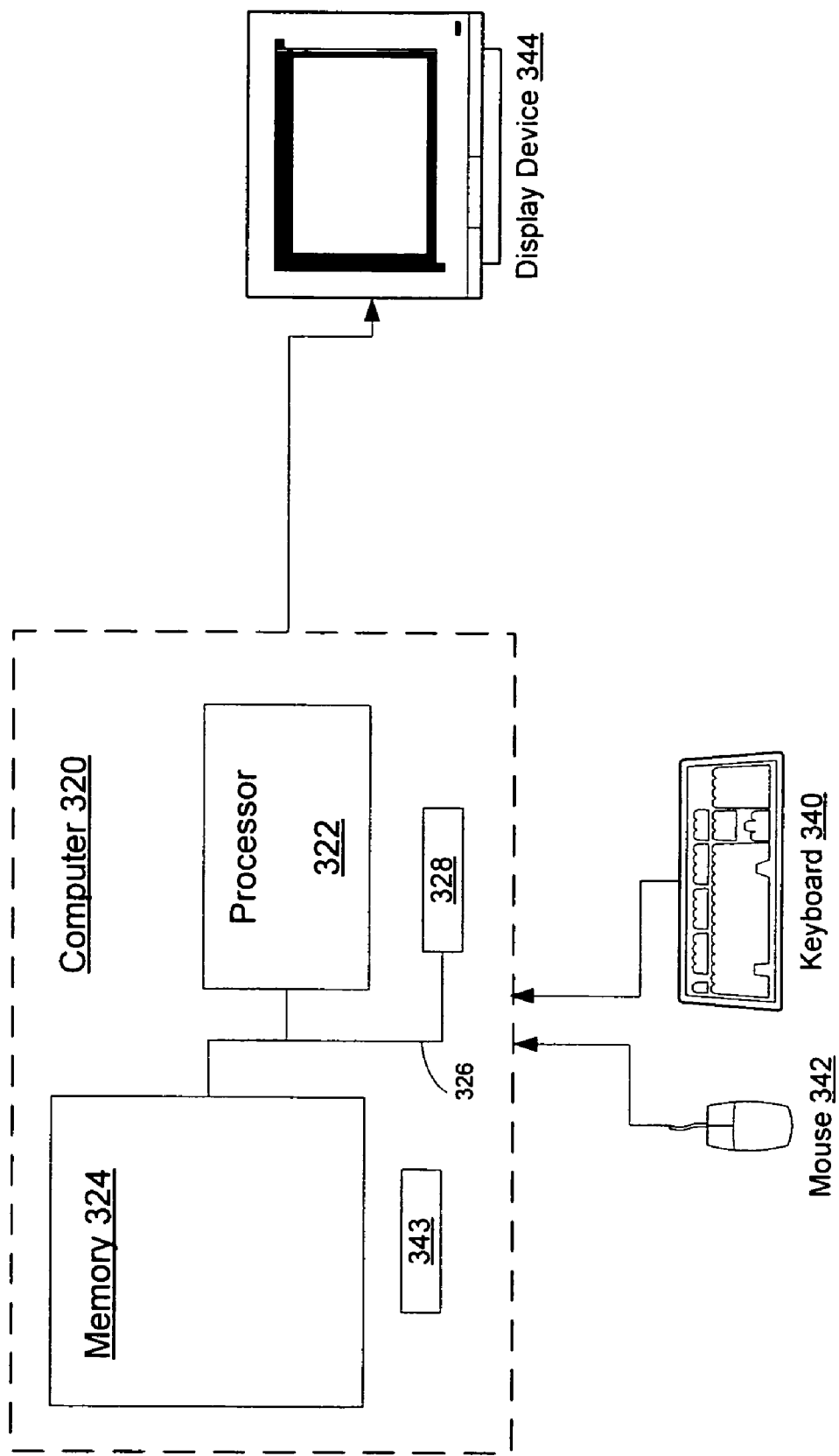
FIG. 2 is a block diagram of a computing system suitable for use in an embodiment of the disclosed systems and methods.

Generally, electronic communication server 110, 112, and 114 as well as media devices 118 are electronic computing systems. FIG. 2 is a block diagram of a generic electronic computing system suitable for use in a system in accordance with the present invention. As shown, computing device 320 includes processing unit 322, system memory 324, and system bus 326 that couples various system components including system memory 324 to the processing unit 322. The system memory 324 might include read only memory (ROM) and random access memory (RAM). The system might further include hard-drive 328 or other memory component, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which may be for example a modem or network adapter, provides for communications over network 102. Processor 322 can be programmed with instructions to interact with other computing systems so as to perform the algorithms described below with reference to FIGS. 5 and 6. The instructions may be received from network 102 or stored in memory 324 and/or hard drive 328. Processor 322 may be loaded with any one of several computer operating systems such as, for example, Windows NT, Windows 2000, Linux, PocketPC, or PalmOS.

Figure 3:
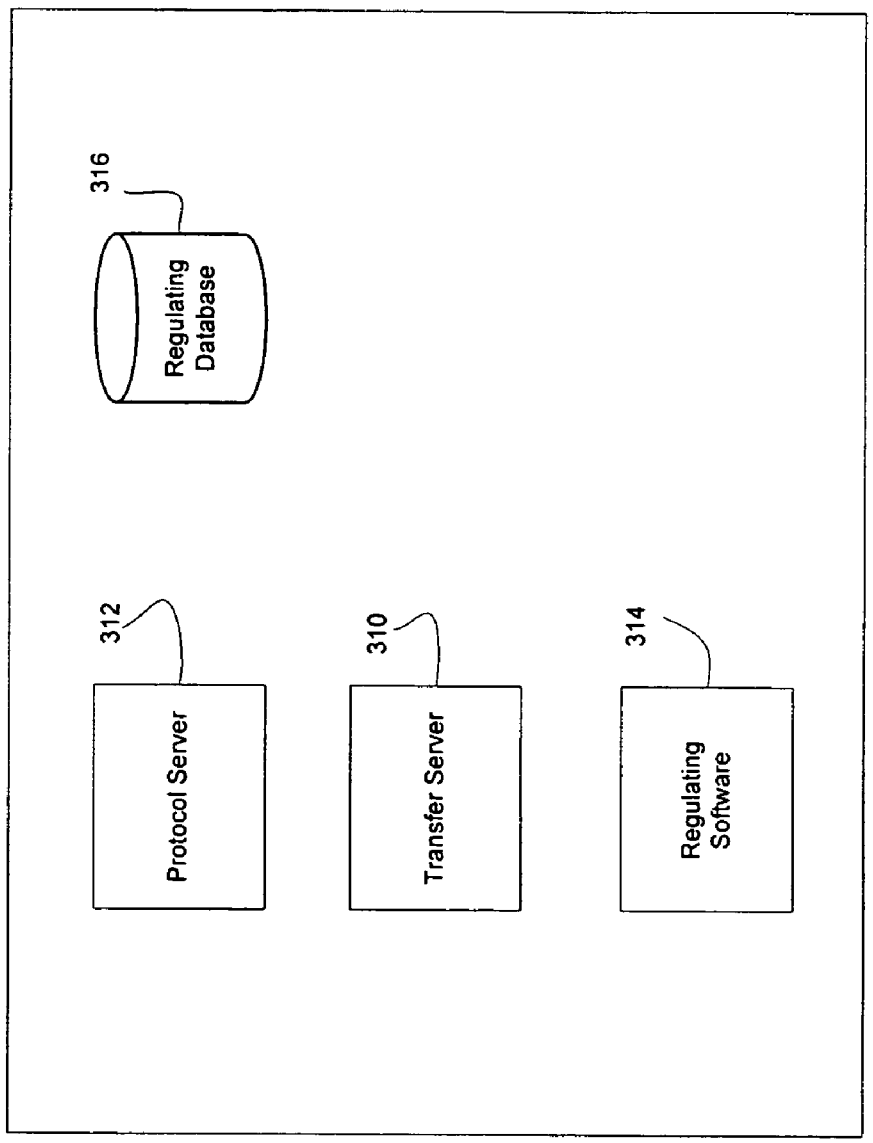
FIG. 3 is a diagram illustrating the functional components of a server computer or cluster of server computers for use in an embodiment of the disclosed systems and methods.

FIG. 3 is a diagram of the software components of electronic communication servers 110, 112, and 114. As shown, electronic communication servers 110, 112, and 114 may comprise transfer server software 310, protocol server software 312, regulating software 314, and database 316. As described previously, media devices 118 are desirably capable of operating as electronic communication servers. Accordingly, such a media device 118 may also comprise transfer server software 310, protocol server software 312, regulating software 314, and database 316.

Transfer server software 310 is operable to receive electronic communications, such as electronic advertisements, from external sources and transfer electronic advertisements with other transfer servers 310 located on other computers. Transfer server software 310 may also be operable to communicate information to third parties indicating the types of electronic communications that a particular user may have authorized. In an illustrative embodiment wherein the electronic communications are e-mails, transfer server 310 may be an SMTP server. Protocol server software 312 is operable to retrieve electronic communications from transfer server 310. In an illustrative embodiment wherein the electronic communications are e-mails, protocol server software 312 may be a POP server. Regulating software 314 operates to regulate the electronic advertisements flowing between servers.

Figure 5:
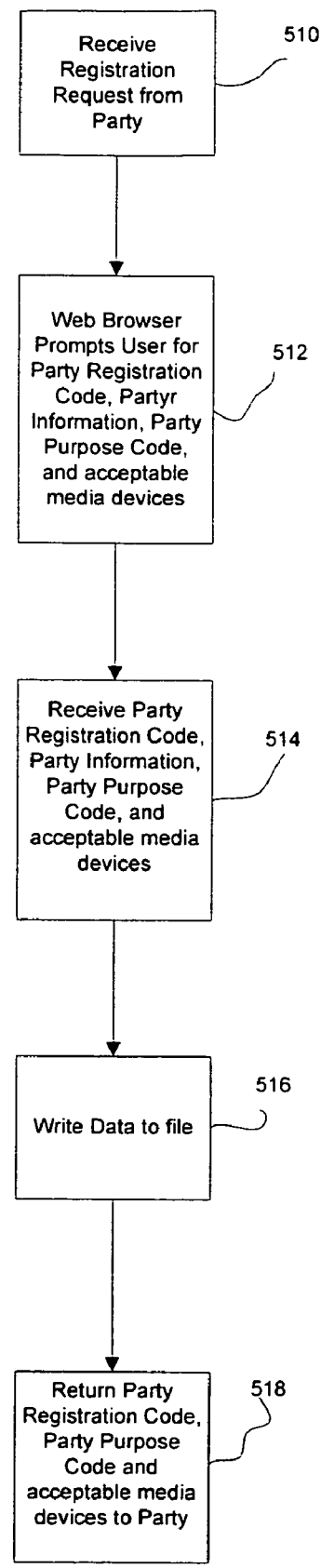
FIG. 5 is a flow diagram of a method for registering parties for sending electronic communications.
Figure 6:
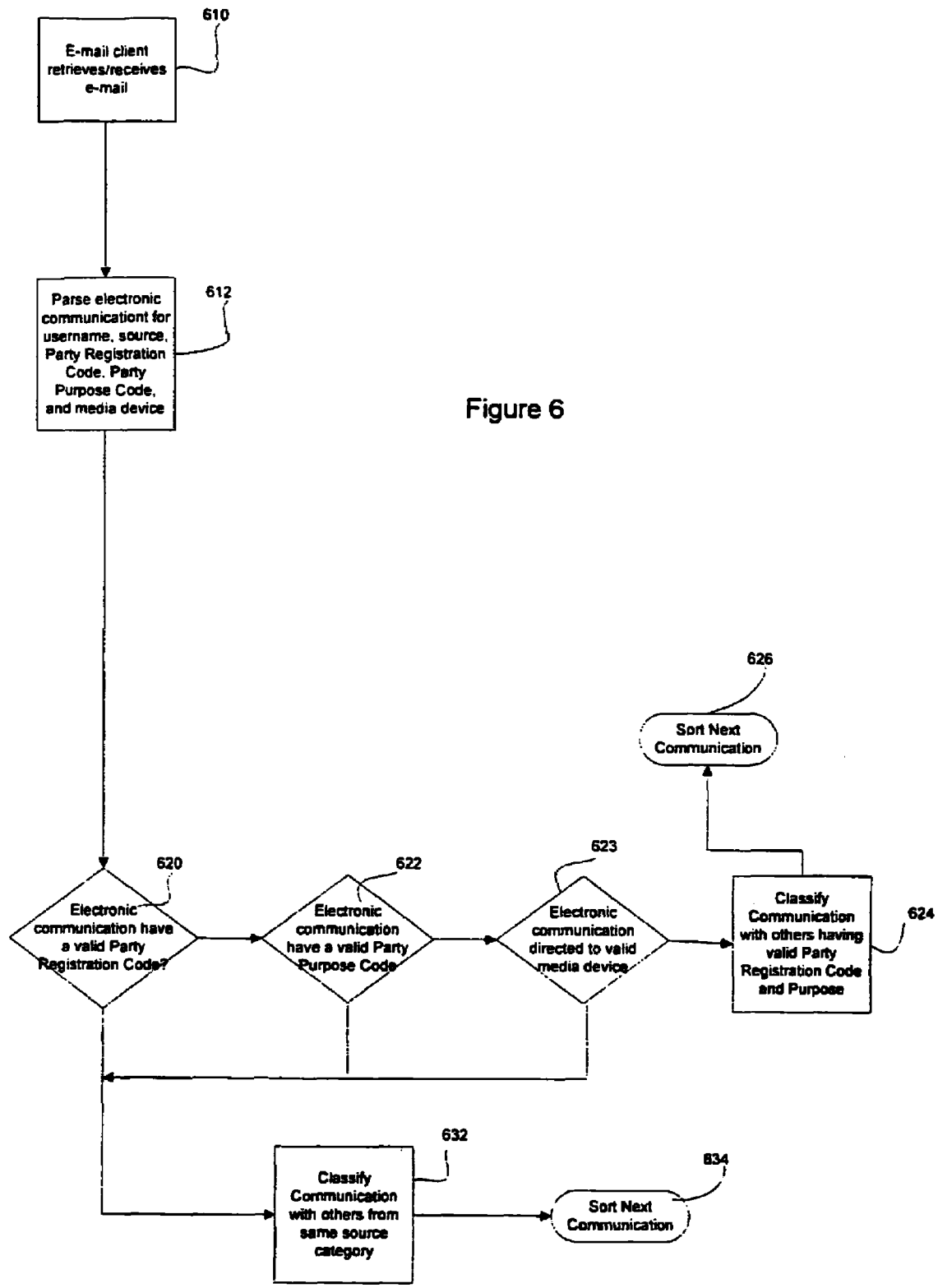
FIG. 6 is a flow diagram of a method for sorting electronic communications.

Regulating database software 316 comprises data that is accessed by software 310, 312, and 314 and used to implement the methods described in reference to FIGS. 5 and 6. For example, database software 316 comprises data specifying for each user, the parties/vendors from which the user has agreed to accept electronic communications. In an exemplary embodiment, this may be accomplished by assigning each party a party registration code. This might also be accomplished by assigning groups or categories of vendors with a party registration code. For example, with respect to e-mail, the following groups or categories may be assigned a registration code: large ISP—designating ISP's servicing a large number of users; medium ISP—designating ISP's servicing a medium number of users; small ISP—designating ISP's servicing a small number of users; .gov—designating sources in the .gov domain; .edu—designating sources in the .edu domain; and .com—designating sources in the .com domain. Of course, other source categories may be used depending upon the type of electronic communication that is being regulated. Those skilled in the art will recognize that while database 316 is depicted as residing on server computers 110, 112, and 114, database 316 could alternatively, or additionally exist on media devices 118 as well. Indeed, database 316 could be distributed and exist on numerous physical devices.

For each party/source, database 316 may also specify the types of electronic communications that a user may have authorized to receive from a particular source by assigning a party registration contact purpose code. For example, with respect to electronic advertisements, database 316 may specify that a user wishes only to receive advertisements relating to special sales or relating to products that the user has previously purchased, but not advertisements generally. Similarly, purpose codes might specify whether the electronic communication is for promotions, billing, general advertising, or some other purpose.

Database 316 may also specify for each party and/or category of electronic communications, the type of media and media device at which the particular type of communications may be received. For example, database 216 may specify that a user wishes to receive general communications in the form of e-mails at a personal computer only, and may further specify that communications regarding rebates should be received in the form of streaming video and audio at a television.

Figure 4:
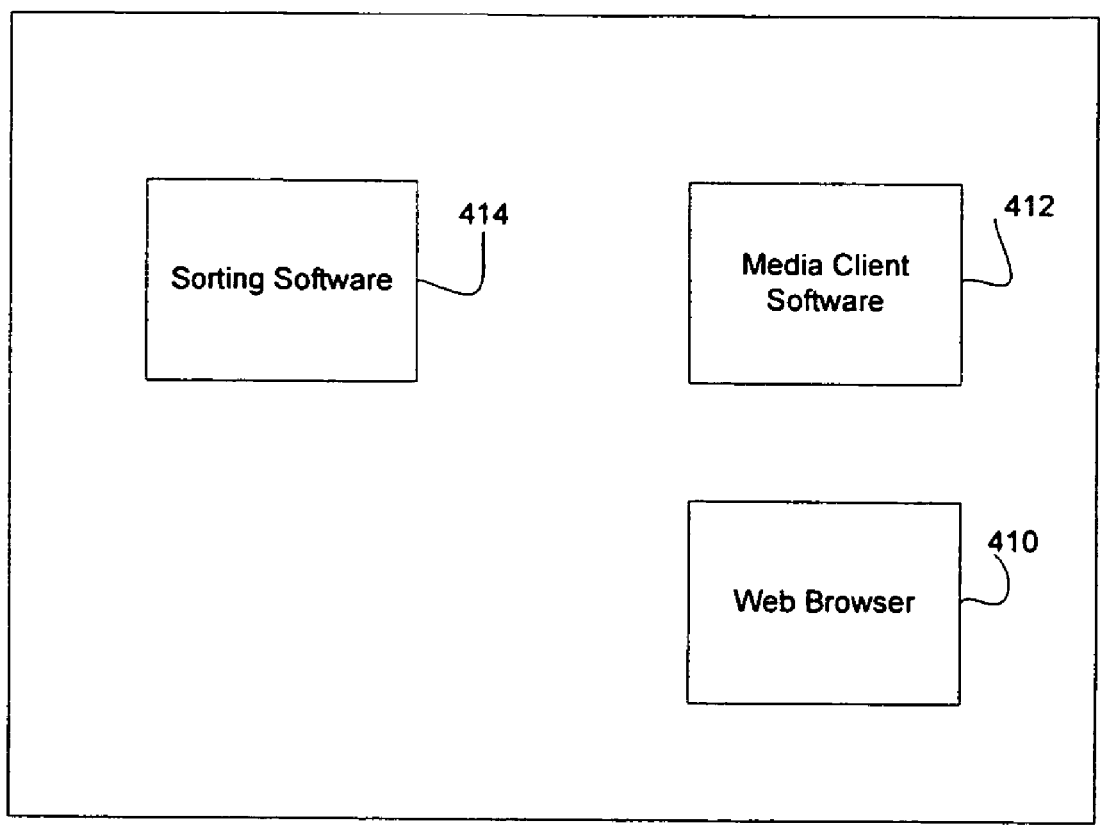
FIG. 4 is a diagram illustrating the functional components of a client computer for use in an embodiment of the disclosed systems and methods.

FIG. 4 is a diagram of the functional software components of media devices 118. As shown, media devices 118 may comprise web browser software 410, media client software 412, and sorting software 414. Web browser software 410 allows media devices 118 to access web pages over network 110. Web browser software 410 may be any one of several well-known web browsers such as, for example, Microsoft Internet Explorer, Netscape Navigator, or other such software. Web browser software 410 may be used in connection with the process described with reference to FIG. 5 to establish electronic communication permissions.

According to an exemplary embodiment, media client software 412 allows clients to receive and access electronic communications from electronic communication servers 110, 112, and 114 and present the electronic communications to a user. With regards to e-mail electronic advertisements, media client software 412 might be any of several well-known e-mail clients such as, for example, Microsoft Outlook or Qualcomm's Eudora.

Sorting software 414 sorts the electronic communications into classifications based upon whether the electronic communication is from a party from whom the user has indicated that he or she wishes to accept electronic communications. Depending on the type of media device, the electronic communications can then be discarded, or presented to the user separately from the authorized electronic communications. Further details regarding the operation of sorting software 414 are provided below in connection with the description of FIGS. 5 and 6. Those skilled in the art will recognize that while sorting software 414 is depicted separately from client software 416, if might be integrated with client software 416.

FIG. 5 is a flowchart of an individualized process for authorizing or registering electronic communication sources to send electronic communications to a media device. In one embodiment, this method is implemented by a web browser that has been programmed to perform the recited steps. As shown, at step 510 a request is received at a web browser to register a particular electronic communication source. Generally, the request is initiated by a user. At step 512, the web browser prompts the user for a party registration code, party information, party registration contact purpose, and approved media devices. The party registration code is a string of characters used to identify electronic communications from the particular electronic communications source. In one embodiment, party registration codes are defined by the user. In an alternative embodiment, however, they might be defined automatically. Party information is simply data about the party and might include information about the party such as, for example, the name of the party or the Internet domain of the party. Party registration purpose codes identify the purpose for which the user authorizes to receive electronic communications. For example, there may be three classes of electronic communication purposes—promotions; billing; and general advertising. Purpose codes might also identify a particular product or service. The user identifies which of these he or she wishes to receive and may specify more than one purpose code. Approved media devices identify the media devices that the user authorizes to receive electronic communications at. For example, the list of media devices that the user desires to receive electronic communications at may include a television, mobile phone, and instant messenger device.

At step 514, the user indicates his or her choices for party registration code, party information, party purpose codes, and approved media devices. At step 516, the media device 118 writes the party information to storage. The storage can comprise a database, or file for example. At step 518, a copy of the party registration code, party purpose code, and approved media device are forwarded to the party via servers 110, 112, and 114.

According to another aspect of the disclosed systems and methods, registration of electronic communication sources may take place via a generic automated process. For example, rather than the user specifying registration information including the party registration code, party information, party purpose code, and approved media device, for each electronic communication source, these items are automatically assigned to an electronic communication source. Furthermore, the registration process may be initiated by the electronic communication sources rather than the users. Accordingly, an electronic communication source may unilaterally request to register to send electronic communications and automatically assigned a party registration code, party purpose codes, and approved media devices without user intervention. A user may have identified a predefined set of codes to be assigned to electronic communication sources that unilaterally request permission to forward electronic communications. According to another aspect of the disclosed systems and methods, the user may accept or deny the request for permissions.

Using party registration information that has been collected, a system in accordance with the present invention is operable to filter and sort electronic communications as shown in FIG. 6. At step 610, an electronic communication is received. At step 612, the electronic communication is parsed so as to identify the following: the party registration code, the party purpose code, and the media device it is directed to.

At step 620, it is determined whether the electronic communication has a valid registration code. Typically this is performed by comparing the party registration code of the electronic communication, if it in fact has one, with the list of valid party registration codes that have been assigned. If the electronic communication has a valid party registration code, at step 622, it is determined whether the electronic communication has a party purpose code corresponding to any that may have been selected by the user for the particular party. This determination is made by comparing the party purpose code from the electronic communication, if any, with the party purpose codes that were saved during the registration process explained above in connection with FIG. 5. If the electronic communication has a party vender purpose code, at step 623, it is determined it the electronic communication is directed to a media device that will accept electronic communications. This determination is made by comparing the media device that the electronic communication is directed to with the acceptable media devices that were saved during the registration process explained above in connection with FIG. 5. If the party registration code, party purpose code, and media device match those provided during registration, at step 624, the electronic communication is classified, usually by making a notation in the appropriate file, for presentation to the user along with other electronic communications that are received from parties to which permission has been given to forward electronic communications to the particular user. Depending on the type of media device 118 that the electronic communication is directed to, a television for example, the electronic communication can be sent directly to the user for display at the media device 118. At step 626, the next electronic communication is sorted.

As an electronic communication is sorted, it is forwarded to the appropriate user at the appropriate electronic media device. Those skilled in the art will recognize that electronic communications may be embedded in other programming. For example, electronic communications, such as electronic advertisements, in the form of streaming video may be embedded in larger segments of video. According to an aspect of the disclosed systems and methods, the advertising segments are identified and sorted as described above. Alternative video data may be inserted into the data stream where the advertisement may have originally been. The alternative video data may be approved advertisements or other data previously selected by the user.

Those skilled in the art understand that computer readable instructions for implementing the above-described processes, such as those described with reference to FIGS. 5 and 6, can be generated and stored on one of a plurality of computer readable media such as a magnetic disk or CD-ROM. Further, a computer such as that described with reference to FIG. 2 may be arranged with other similarly equipped computers in a network, and each computer may be loaded with computer readable instructions for performing the above-described processes. Specifically, referring to FIG. 2, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, although parts of the description above have been directed toward electronic advertisements, it should be appreciated that the invention is not so limited but is applicable to other types of electronic communications. Furthermore, while steps of the processes depicted in FIGS. 5 and 6 have been described as being performed by one or the other of servers 100, 112, 114, and client devices 118, it should be appreciated that processing may be performed in combination amongst various machines. Accordingly, reference should be made to the appended claims as indicating the scope of the invention.

What is claimed is:

1. A method of processing an electronic communication, comprising:

receiving at a computer the electronic communication addressed to a recipient;

identifying at the computer that the electronic communication has a recipient defined purpose code, a party registration code and a media device code associated with the electronic communication;

detecting whether the recipient defined purpose code of the electronic communication identifies one of a particular product for which the recipient has authorized delivery of related electronic communications and a particular service for which the recipient has authorized delivery of related electronic communications;

determining whether the media device code corresponds to a media device authorized to receive the electronic communication associated with the recipient defined purpose code;

designating the electronic communication for presentation on the media device, irrespective of the party registration code, in response to determining that the media device is authorized to receive the electronic communication and in response to detecting that the recipient defined purpose code of the electronic communication identifies one of a particular product for which the recipient has authorized delivery of related electronic communications and a particular service for which the recipient has authorized delivery of related electronic communications; and presenting the electronic communication to the recipient on the media device in response to designating the electronic communication for presentation on the media device.

2. The method of claim 1, further comprising identifying whether the electronic communication has a party registration code that corresponds to a source that has been identified as an authorized source of electronic communications.

3. The method of claim 1, further comprising identifying whether the electronic communication has a party registration code and querying a database to determine whether the party registration code associated with the electronic communication is identified in the database as corresponding to an authorized source of electronic communications.

4. The method of claim 1, further comprising identifying whether the electronic communication is a type that has been authorized for the device of the recipient.

5. The method of claim 2, further comprising presenting the electronic communication with other electronic communications having party registration codes.

6. The method of claim 1, wherein presenting the electronic communication comprises presenting the electronic communication on at least one of a television, a personal digital assistant, a mobile phone, a pager, a telephone, and a computer.

7. The method of claim 1, wherein presenting the electronic communication comprises presenting at least one of an email, a text message, and streaming video.

8. The method of claim 1, wherein the electronic communication comprises an electronic advertisement.

9. A non-transitory computer-readable medium with computer-executable instructions stored thereon for:

receiving an electronic communication addressed to a recipient;

identifying that the electronic communication has a recipient defined purpose code, a party registration code and a media device code associated with the electronic communication;

detecting whether the recipient defined purpose code of the electronic communication is associated with a media device of the recipient and identifies one of a particular product for which the recipient has authorized delivery of related electronic communications and a particular service for which the recipient has authorized delivery of related electronic communications;

determining whether the media device code corresponds to a media device authorized to receive the electronic communication associated with the recipient defined purpose code;

designating the electronic communication for presentation on the media device, irrespective of the party registration code, in response to determining that the media device is authorized to receive the electronic communication and in response to detecting that the recipient defined purpose code of the electronic communication identifies one of a particular product for which the recipient has authorized delivery of related electronic communications and a particular service for which the recipient has authorized delivery of related electronic communications; and presenting the electronic communication to the recipient on the media device in response to designating the electronic communication for presentation on the media device.

10. The computer-readable medium of claim 9, further comprising computer-executable instructions for identifying whether a party registration code associated with the electronic communication corresponds to a source that has been identified as an authorized source of electronic communications.

11. The computer-readable medium of claim 10, further comprising computer-executable instructions for presenting the electronic communication with other electronic communications having party registration codes.

12. A method of processing electronic communications, comprising:

maintaining a database at a computer identifying characteristics of authorized electronic communications, the characteristics having been previously created by a recipient of the authorized electronic communications;

receiving at the computer an electronic communication addressed to the recipient;

identifying at the computer that the electronic communication has a recipient defined purpose code, a party registration code and a media device code associated with the electronic communication;

querying the database to determine whether the electronic communication has characteristics of authorized electronic communications including whether the recipient defined purpose code is associated with a media device of the recipient and identifies one of a particular product for which the recipient has authorized delivery of related electronic communications and a particular service for which the recipient has authorized delivery of related electronic communications;

designating the electronic communication for presentation on the media device, irrespective of the party registration code, in response to determining that the media device is authorized to receive the electronic communication and in response to detecting that the recipient defined purpose code of the electronic communication identifies one of a particular product for which the recipient has authorized delivery of related electronic communications and a particular service for which the recipient has authorized delivery of related electronic communications; and presenting the electronic communication with other electronic communications that have characteristics of authorized electronic communications to the recipient on the media device in response to designating the electronic communication for presentation.

13. The method of claim 12, wherein maintaining a database identifying characteristics of authorized electronic communications comprises maintaining a database identifying sources from which authorized electronic communications are received.

14. The method of claim 12, wherein presenting electronic communications that have characteristics of authorized electronic communications comprises presenting authorized electronic communications at least one of the following: a television, a PDA, a pager, a telephone, and a computer.

15. The method of claim 12, wherein maintaining a database identifying characteristics of authorized electronic communications comprises receiving data from a user specifying authorized parties from which electronic communications may be received.

16. The method of claim 12, further comprising receiving requests from parties to update the database to identify parties as a source of authorized electronic communications.

17. The method of claim 12, wherein the electronic communication is an electronic advertisement.

18. A system for processing electronic communications comprising a processor and memory, comprising:
- a computer-readable database comprising data identifying a recipient defined purpose code that is authorized for delivery of an electronic communications to a media device of a user, the recipient defined purpose code identifying one of a particular product and a particular service; and
- a software server adapted to receive an electronic communication at a computer and to access the database to determine whether the electronic communication comprises a recipient defined purpose code that is authorized for delivery to the media device of the user, irrespective of the sender of the electronic communication, the recipient defined purpose code identifying one of the particular product for which the recipient has authorized for delivery of related electronic communications and the particular service for which the recipient has authorized for delivery of related electronic communications.

19. The system of claim 18, wherein the database comprises a vendor registration code for each source that is authorized to forward electronic communications to the user, wherein the electronic communication comprises data identifying a vendor registration code, and wherein the software server is adapted to compare the data identifying a vendor registration code from the electronic communication with the database to determine whether the electronic communication is from a source authorized to forward electronic communications to the user.

20. The system of claim 18, wherein the software server is further adapted to forward an electronic communication received from an authorized source to the user.

21. The system of claim 18, further comprising a second software server adapted to communicate to sources of electronic communications data indicating the types of electronic communications the user has authorized.

* * * * *